US 8,315,213 B2

(12) United States Patent
Yin et al.

(10) Patent No.: US 8,315,213 B2
(45) Date of Patent: Nov. 20, 2012

(54) SYSTEM AND METHOD FOR ALLOCATING SUBCHANNELS AMONG MOBILE STATIONS IN A WIRELESS ACCESS NETWORK

(75) Inventors: Hujun Yin, San Jose, CA (US); Roshni Srinivasan, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 11/394,476

(22) Filed: Mar. 31, 2006

(65) Prior Publication Data
US 2007/0230405 A1 Oct. 4, 2007

(51) Int. Cl.
*H04W 4/00* (2009.01)
(52) U.S. Cl. ..... 370/329; 370/335; 370/342; 370/395.1; 370/395.21; 370/468; 455/450; 455/453; 455/452.1; 455/452.2
(58) Field of Classification Search ................. 370/329, 370/335, 342, 395.1, 395.21, 468; 455/450, 455/452.2, 452.1, 453
See application file for complete search history.

(56) References Cited

U.S. PATENT DOCUMENTS

| | | | | |
|---|---|---|---|---|
| 5,930,246 | A * | 7/1999 | Akutsu | 370/337 |
| 6,442,151 | B1 * | 8/2002 | H'mimy et al. | 370/333 |
| 7,069,009 | B2 * | 6/2006 | Li et al. | 455/446 |
| 7,155,236 | B2 * | 12/2006 | Chen et al. | 455/454 |
| 2001/0038630 | A1 | 11/2001 | Tong et al. | |
| 2002/0183066 | A1 * | 12/2002 | Pankaj | 455/453 |
| 2003/0223429 | A1 * | 12/2003 | Bi et al. | 370/395.4 |
| 2004/0037286 | A1 * | 2/2004 | Huang et al. | 370/394 |
| 2004/0160914 | A1 * | 8/2004 | Sarkar | 370/329 |
| 2005/0002352 | A1 * | 1/2005 | Bao et al. | 370/328 |
| 2005/0021438 | A1 * | 1/2005 | Tezuka et al. | 705/36 |
| 2005/0032514 | A1 | 2/2005 | Sadri et al. | |
| 2005/0176440 | A1 * | 8/2005 | Sang et al. | 455/453 |
| 2006/0056451 | A1 | 3/2006 | Yano et al. | |
| 2007/0149236 | A1 * | 6/2007 | Naden et al. | 455/522 |
| 2008/0095223 | A1 * | 4/2008 | Tong et al. | 375/228 |

FOREIGN PATENT DOCUMENTS

| | | |
|---|---|---|
| CN | 1741412 A | 3/2006 |
| JP | 2002252619 | 9/2002 |
| JP | 2006067572 | 3/2006 |
| WO | WO-2005089006 A1 | 9/2005 |
| WO | WO-2005096522 A1 | 10/2005 |
| WO | WO-2007/115236 A2 | 10/2007 |

OTHER PUBLICATIONS

"PCT Application No. PCT/US2007/065736, International Search Report mailed Oct. 19, 2007", 5 pgs.
"PCT Application No. PCT/US2007/065736, Written Opinion mailed Oct. 19, 2007", 6 pgs.

(Continued)

*Primary Examiner* — Rafael Pérez-Gutiérrez
*Assistant Examiner* — Liton Miah
(74) *Attorney, Agent, or Firm* — Schwegman, Lundberg & Woessner, P.A.

(57) ABSTRACT

Embodiments of base station and method for allocating subchannels of a time-slot in a wireless access network are generally described herein. Other embodiments may be described and claimed. In some embodiments, the assignment of subchannels may be based on subchannel quality and average throughput for mobile stations currently associated with a base station. In some embodiments, modified proportional fairness may be achieved.

21 Claims, 3 Drawing Sheets

OTHER PUBLICATIONS

"Chinese Application No. 200780012247.3, Non Final Office Action dated Jul. 14, 2011", 6 pgs.

"Chinese Application No. 200780012247.3, Office Action mailed Oct. 9, 2010", 11 pgs.

"Chinese Application No. 200780012247.3, Office Action mailed Aug. 1, 2011", 8 pgs.

"Japanese Application No. 2009-503328, Office Action mailed May 24, 2011", 8 pgs.

"Chinese Application No. 200780012247.3, Office Action Response filed Sep. 22, 2011", 14 pgs.

"Japanese Application No. 2009-503328, Office Action mailed Sep. 20, 2011", 6 pgs.

Yin, Hujun, et al., "OFDMA: A Broadband Wireless Access Technology", IEEE Sarnoff Symposium, (Mar. 28, 2006), 1-4.

* cited by examiner

SYSTEM AND METHOD FOR ALLOCATING SUBCHANNELS AMONG MOBILE STATIONS IN A WIRELESS ACCESS NETWORK

TECHNICAL FIELD

Some embodiments of the present invention pertain to wireless communication networks and some embodiments pertain to wireless access networks.

BACKGROUND

In wireless networks, subchannel quality and achievable throughput for each user may vary over time. Allocating bandwidth to users with the highest achievable throughput results in the assignment of bandwidth when channel conditions for that user are most favorable. Wireless access networks that use a multicarrier access technique, such as orthogonal frequency division multiple access (OFDMA), allow the resource (i.e., subchannels and time-slots) of a frame to be assigned to several users. For example, different users may be assigned different subchannels with the same time-slot. One issue with some conventional wireless access networks is achieving fairness in assigning the resource among competing users.

Thus, there are general needs for systems and methods that allocate subchannels of time-slots to users in a fair manner while maintaining a high overall system throughput. There are also needs to effectively achieve proportional fairness in wireless access networks when frequency selective channel quality information is available.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
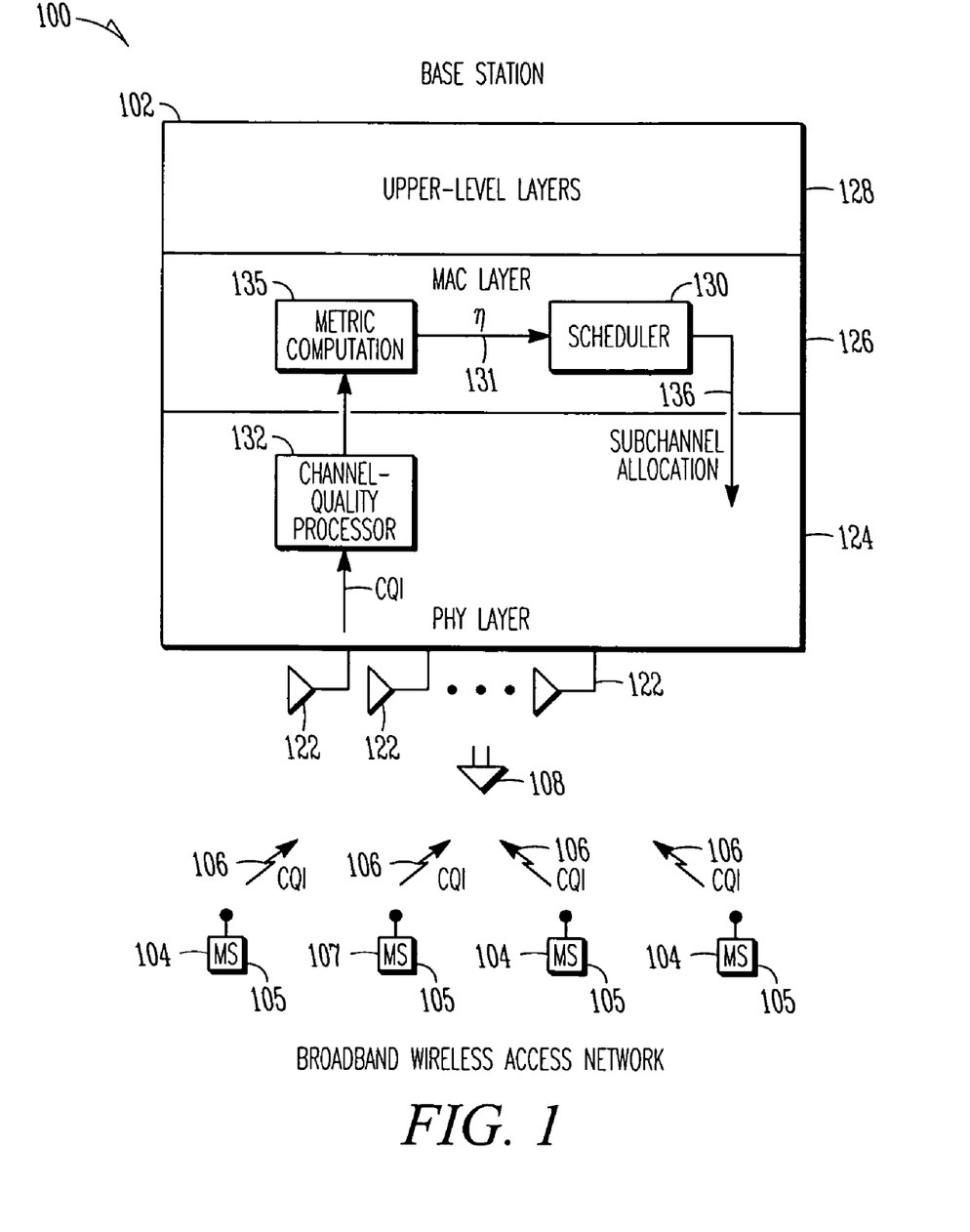
FIG. 1 illustrates a broadband wireless access (BWA) network in accordance with some embodiments of the present invention.

FIG. 1 illustrates a BWA network in accordance with some embodiments of the present invention. BWA network 100 includes base station 102 which communicates with one or more of mobile stations 105 over wireless communication channels. In some embodiments, base station 102 transmits downlink frame 108 to mobile stations 105 in accordance with a multicarrier access technique, such as orthogonal frequency division multiple access (OFDMA), although the scope of the invention is not limited in this respect.

Base station 102 includes physical (PHY) layer 124 which uses one or more antennas 122 to communicate with mobile stations 105. Base station 102 also includes media access control (MAC) layer 126 for controlling access to the wireless channels, and one or more upper-level layers 128 to operate one or more applications, among other things.

In accordance with some embodiments of the present invention, MAC layer 126 may include scheduler 130 to allocate subchannels of time-slots of downlink frame 108 among two or more mobile stations 105 based on subchannel quality and average throughput for each of mobile stations 105. In some embodiments, scheduler 130 may provide subchannel allocation 136 to PHY layer 124 for transmission to mobile stations 105. MAC layer 126 may also include metric-computation unit 135 to generate a modified proportionally-fair (PF) metric η 131 for use by scheduler 130. PHY layer 124 may include channel-quality processor 132 to calculate subchannel quality and average throughput for mobile stations 105 for use by metric-computation unit 135 in generating modified PF metric 131.

In some embodiments, mobile stations 105 may provide channel quality indicators (CQIs) 106 to base station 102 for use by channel-quality processor 132. Channel-quality processor 132 may receive and/or use CQIs 106 on a per-subcarrier basis or CQIs 106 on a composite/subchannel basis. In some embodiments, channel-quality processor 132 may generate a channel quality-to-rate mapping for use by metric-computation unit 135. These embodiments are described in more detail below. Although metric-computation unit 135 may be referred to as a unit and channel-quality processor 132 is referred to as a processor, the scope of the invention includes both software and/or hardware implementations. In some embodiments, MAC layer 126 may be implemented entirely by software and/or software configured elements, although the scope of the invention is not limited in this respect. In some embodiments, one or more of mobile stations 105 may also have a channel-quality processor or other channel quality-processing circuitry at the PHY layer to measure and report CQIs 106 to base station 102.

Figure 2:
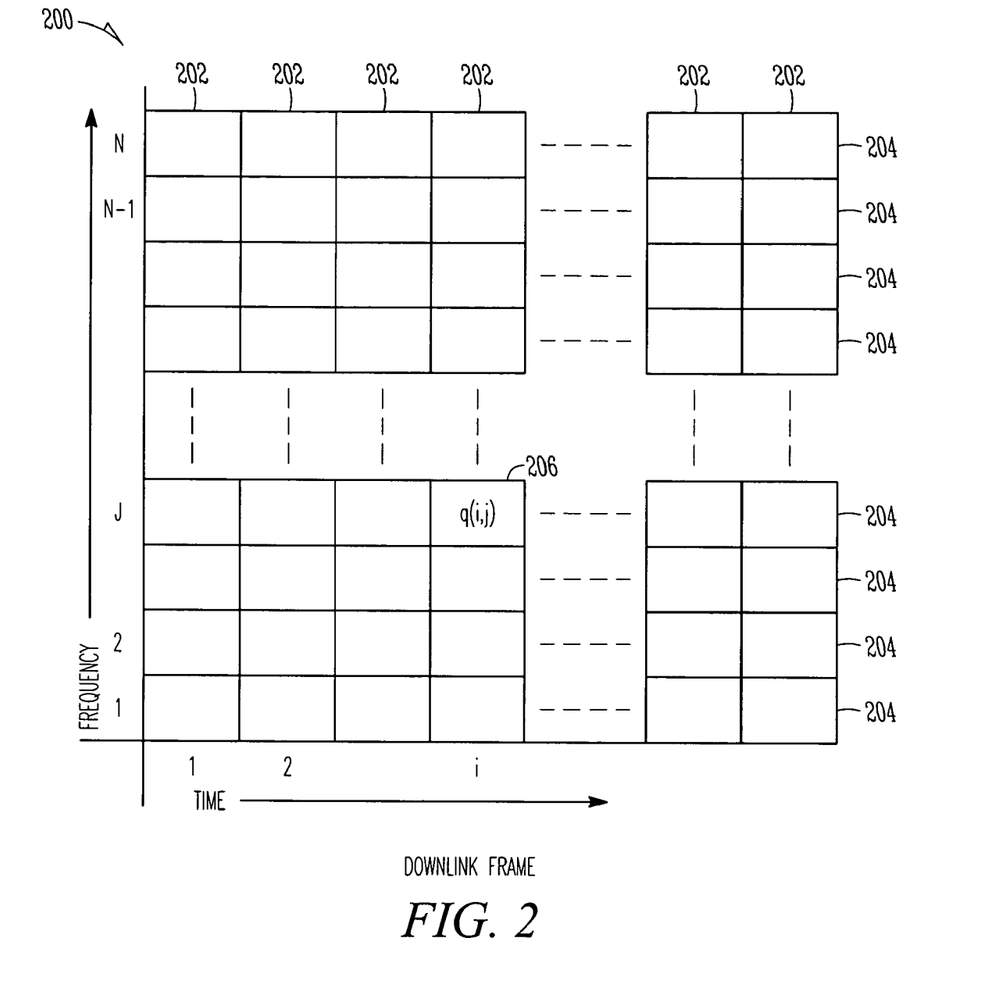
FIG. 2 illustrates a downlink frame of a BWA network in accordance with some embodiments of the present invention.

FIG. 2 illustrates a downlink frame of a BWA network in accordance with some embodiments of the present invention. Downlink frame 200 may correspond to downlink frame 108 (FIG. 1). Downlink frame 200 includes time-slots 202 illustrated in the x-dimension (i.e., time) and subchannels 204 illustrated in the y-dimension (i.e., frequency). Each subchannel 204 may comprise a group of subcarriers. In accordance with some embodiments, each single subchannel/time-slot 206, shown as single subchannel/time slot q(i, j), may be allocated to a particular one of mobile stations 105 (FIG. 1) by scheduler 130 (FIG. 1).

Referring to FIG. 1 and FIG. 2 together, in accordance with some embodiments, metric-computation unit 135 may calculate a ratio based on a measure of the subchannel quality to the average throughput for each mobile station 105. Scheduler 130 may select two or more mobile stations 104 having the highest ratios and may assign most or all of subchannels 204 of a particular time-slot 202 to selected mobile stations 104. In some embodiments, a group of mobile stations 104 may be selected. In some embodiments, mobile stations 104 with the greatest (i.e., best) ratio of the sum of the instantaneous throughput in all subchannels 204 to their time-averaged throughput may be selected. In these embodiments, mobile stations 107 with lower instantaneous throughput values (i.e., the numerator of the ratio) are less likely to be selected for a current time-slot. In some of these embodiments, as the time-averaged throughput (i.e., the denominator of the ratio) of mobile stations that are not selected for the current time-slot decreases, the ratio increases thereby increasing the chances that these non-selected mobile stations are selected for the next time-slot. In this way, a modified proportional fairness in assigning time-slots may be achieved.

In some embodiments, the number of mobile stations 105 in a group to be concurrently scheduled within one time slot may be determined to control fairness and service differentiation. In some embodiments, the number of mobile stations 105 in a group may be less than the number of available subchannels. This may result in a higher overall system throughput.

In some embodiments, scheduler 130 may refrain from assigning subchannels of time-slot 202 to non-selected mobile stations 107, although the scope of the invention is not limited in this respect. In some embodiments, scheduler 130 may further determine the number of mobile stations 105 to select for assigning subchannels 204 of a current time-slot based on bandwidth requirements and/or service-level requirements for mobile stations 105. In some embodiments, the number of mobile stations 105 selected by scheduler 130 is not greater than a number of subchannels 204 in time-slot 202. In some embodiments, the bandwidth and service-level requirements used to select the number of mobile stations for assignment may be based on quality-of-service (QoS) level requirements of applications, such as voice-over-IP (VoIP) applications and/or video streaming applications, although the scope of the invention is not limited in this respect. Bandwidth and service-level requirements for applications may be provided by upper-level layers 128, although the scope of the invention is not limited in this respect. In these embodiments, while the number of mobile stations to be selected may be based on their application requirements, the particular mobile stations of the plurality may be selected based on their subchannel quality and average throughput.

In some embodiments, metric-computation unit 135 may update the average throughput for the selected mobile stations based on a throughput of prior assigned time-slots. In some embodiments, metric-computation unit 135 may use a resulting time-slot throughput (v) and may calculate the ratio based on the updated average throughput.

In some embodiments, scheduler 130 may select and assign subchannels for a next time-slot of downlink frame 200 by considering each mobile station 105 for selection based on the updated average throughput. In this way, most or all of mobile stations 105 may be considered again and some may be selected. Mobile stations 104 selected for a next time-slot may or may not include mobile stations 107 that were not selected for the prior time-slot. These steps may be performed for most or all of mobile stations 105 for which base station 102 has data to send, although the scope of the invention is not limited in this respect.

In some embodiments, the average throughput may be initialized to approximately zero or a small positive number to avoid dividing by zero. In these embodiments, the average throughput may be a running time average of throughput that may be updated for mobile stations 105 after the subchannels of a time-slot are assigned. In some embodiments, the granularity of the average throughput may be as small as single subchannel/time-slot 206, although the scope of the invention is not limited in this respect.

In some embodiments, the average throughput for each of mobile stations 105 may be updated by metric-computation unit 135 by weighting a throughput of prior time-slot allocations and a current time-slot allocation. In some embodiments, the average throughput may be updated based on the following equation:

$$\theta(i+1)=(1-\epsilon)\theta(i)+\epsilon v(i+1),$$

In this equation, $\theta$ represents the average throughput, i represents the current time-slot, v represents the instantaneous or current time-slot throughput, and $\epsilon$ is a weighting factor for weighting the throughput of prior allocations and oppositely weighting the throughput for the current allocation. In some embodiments, the weighting factor $\epsilon$ may be viewed as a low pass filtered throughput and the above equation may represent a low-pass weighting of the throughput. In some embodiments, PHY layer 124 may transmit downlink frame 108 comprising two or more time-slots 202 having the subchannels 204 of each of time-slots 202 assigned based on the updated average throughput.

In some embodiments, when BWA network 100 may implement an OFDMA technique for transmitting communication signals, subchannels 204 may comprise groups of adjacent subcarriers. In these embodiments, the subchannel quality may be calculated from CQI 106 provided by mobile stations 105 for each of subchannels 204.

In some embodiments, the groups of adjacent subcarriers may be contiguous groups of subcarriers in the frequency spectrum in which each group may define a subchannel, such as one of subchannels 204. In some embodiments, groups of adjacent subcarriers may be used in lower-mobility scenarios in which one or more of mobile stations 105 may be moving slowly or may be stationary. In higher-mobility scenarios, the subchannels may comprise groups of non-contiguous or non-adjacent subcarriers, although the scope of the invention is not limited in this respect. The non-contiguous subcarriers may be referred to as permuted subcarriers because the subcarriers of each subchannel may be distributed across the channel bandwidth. The use of adjacent subcarriers in lower-mobility scenarios allows base station 102 to take advantage of groups of higher-throughput subcarriers (i.e., higher subchannel quality) for particular mobile stations, rather than using an average throughput that results with the use of permuted subcarriers.

In some embodiments, the measure of subchannel quality for each mobile station may also be based on an instantaneous sum rate over all the subchannels that may be calculated by channel-quality processor 132 from channel quality information, such a signal-to-noise ratio (SNR) and/or a signal to interference and noise ratio (SINR), indicated by CQIs 106 provided by mobile stations 105. Other types of channel quality information may include data-rate information, transmission mode information for multiple-input multiple-output (MIMO) embodiments, and pre-coding information, although the scope of the invention is not limited in these respects. In some embodiments, the following equation may be used to calculate the instantaneous sum rate for each mobile station:

$$\bar{r}_m(i) = \sum_{j=1}^{N} r_m(i, j).$$

In this equation, $r_m(i, j)$ represents the achievable rate per subchannel which may be calculated from the effective SNR. In some embodiments, the effective SNR may be provided as feedback by mobile stations 105 for each subchannel in time-slot i as part of CQI 106, although the scope of the invention is not limited in this respect.

In some embodiments, link-level simulations may be used to generate a mapping between the effective SNR and the modulation and coding scheme that is used for transmission at a target packet error rate. In some embodiments, the modulation and coding scheme may determine the achievable rate per subchannel, although the scope of the invention is not limited in this respect. The modulation and coding rate may determine a number of bits that may be effectively modulated on each symbol, such as a quadrature amplitude modulation (QAM) symbol.

In some embodiments, the effective SNR may be calculated using the following equation:

$$g_m(i, j) = -\beta\left(\ln\frac{1}{K}\sum_{k=0}^{k=K-1} e^{-\gamma_k 1\beta}\right).$$

In this equation, $\gamma_k$ is the SNR for the $k^{th}$ subcarrier in the $j^{th}$ subchannel over the $i^{th}$ time-slot. In some embodiments, average white Gaussian noise (AWGN) curves may be used by scheduler 130 to determine a block error ratio (BLER) corresponding to the effective SNR. In some embodiments, for each modulation and coding scheme used for transmission, $\beta$ may be chosen such that the BLER, with respect to the effective SNR, approximates an actual BLER, although the scope of the invention is not limited in this respect.

In some embodiments, the ratio of subchannel quality to average throughput for each mobile station 105 may be calculated by channel-quality processor 132 based on modified PF metric 131, which may equal the ratio of the instantaneous sum rate to the average throughput for a selected mobile station. In some embodiments, the ratio of subchannel quality to average throughput for each mobile station may be calculated using the following equation:

$$\eta_m(i) = \frac{\overline{r}_m(i)}{\theta_m(i)}.$$

In this equation, $\overline{r}_m$ represents the instantaneous sum rate and $\theta_m$ refers to the average throughput for a selected mobile station. In this equation, $\eta_m(i)$ may represent modified PF metric 131.

In some embodiments, scheduler 130, prior to assigning the subchannels, may generate a rate matrix comprising rate vectors of achievable throughputs of the selected mobile stations. The rate vectors of selected mobile stations 104 may be duplicated a number of times based on a number of subchannels to be allocated to each mobile station. In these embodiments, scheduler 130 may assign subchannels by applying an optimization algorithm to the rate matrix. In some embodiments, the rate matrix may be referred to as a cost matrix. In some embodiments, the elements of the rate matrix may represent the rates that may be supported by a mobile station in a particular subchannel. In some embodiments, the optimization algorithm that is applied to the rate matrix may include a binary assignment algorithm, such as the Hungarian algorithm, although the scope of the invention is not limited in this respect.

In one example, the number of mobile stations 104 selected may be two and the number of subchannels available for assignment in the current time-slot may be four (N=4). In this example, according to channel profiles of the mobile stations, the achievable rate vector in the available subchannels for each mobile station may be $r_1=[2,4,3,4.5]^T$ and $r_2=[3.5,3,1,4]^T$, where the values in the rate vectors may indicate a rate in megabits-per-second. In this example, the overall time-slot throughput may be maximized by allocating two subchannels to each user. An example rate matrix that may be constructed from the achievable rate vectors for each mobile station is shown below.

$$R = \begin{matrix} 2 & 2 & 3.5 & 3.5 \\ 4 & 4 & 3 & 3 \\ 3 & 3 & 1 & 1 \\ 4.5 & 4.5 & 4 & 4 \end{matrix}$$

In rate matrix R, each mobile station's achievable rate vector is repeated twice. A permutation matrix X having the same dimensions as rate matrix R may be generated such that every row and column of the permutation matrix may have one element equaling one and may have the other elements equaling zero. In these embodiments, an objective function may be formulated from the rate matrix and the permutation matrix for use in assigning the particular subchannels of a time-slot. In some embodiments, objective function C, illustrated below, may be formulated for maximizing the time-slot throughput:

$$C = \underset{X}{\operatorname{argmax}} \sum_{i=1}^{N-1}\sum_{j=1}^{N-1} X(i, j)R(i, j) \qquad (1)$$

An alternate rate matrix may be defined as:

$$R' = \max_{i,j} R(i, j) - R,$$

Equation (1) may be rewritten as a minimization problem as follows:

$$C = \underset{X}{\operatorname{argmin}} \sum_{i=1}^{N-1}\sum_{j=1}^{N-1} X(i, j)R'(i, j) \qquad (2)$$

Equation (2) is in the form of a binary assignment problem that may be solved by scheduler 130 using a binary assignment algorithm, such as the Hungarian Algorithm, although the scope of the invention is not limited in this respect. In the example above, the solution to Equation (2) may provide each of the two selected mobile stations with two subchannels in the current time-slot. Although the above example includes only two selected mobile stations and four subchannels, the scope of the invention includes up to many hundreds of mobile stations and up to many hundreds of subchannels.

Although base station 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 102 may refer to one or more processes operating on one or more processing elements.

In some embodiments, base station 102 and mobile stations 105 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. Each subcarrier may have a null at substantially a center frequency of the other subcarriers and/or each subcarrier may have an integer number of cycles within a symbol period, although the scope of the invention is not limited in this respect. In some embodiments, base station 102 and mobile stations 105 may communicate in accordance with a multicarrier access technique, such as OFDMA, although the scope of the invention is not limited in this respect. In some embodiments, base station 102 and mobile stations 105 may communicate using spread-spectrum signals, although the scope of the invention is not limited in this respect.

In some embodiments, BWA network 100 may be a Worldwide Interoperability for Microwave Access (WiMax) network and base station 102 and mobile stations 105 may be WiMax communication stations, although the scope of the invention is not limited in this respect. In some embodiments, any one or more of base station 102 and/or mobile stations 105 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the frequency spectrums for the communication signals used by base station 102 and mobile stations 105 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the scope of the invention is not limited in this respect.

In some embodiments, base station 102 and mobile stations 105 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005, and related amendments/versions.

Antennas 122 may comprise one or more directional or omnidirectional antennas, including, for example, dipole antennas, monopole antennas, patch antennas, loop antennas, microstrip antennas, or other types of antennas suitable for transmission of RF signals. In some multiple antenna embodiments, two or more antennas may be used. In some embodiments, instead of two or more antennas, a single antenna with multiple apertures may be used. In these embodiments, each aperture may be considered a separate antenna. In some embodiments, each antenna may be effectively separated to take advantage of spatial diversity and the different channel characteristics that may result between each of antennas 122 and another wireless communication device. In some embodiments, antennas 122 may be separated by up to $\frac{1}{10}$ of a wavelength or more.

Figure 3:
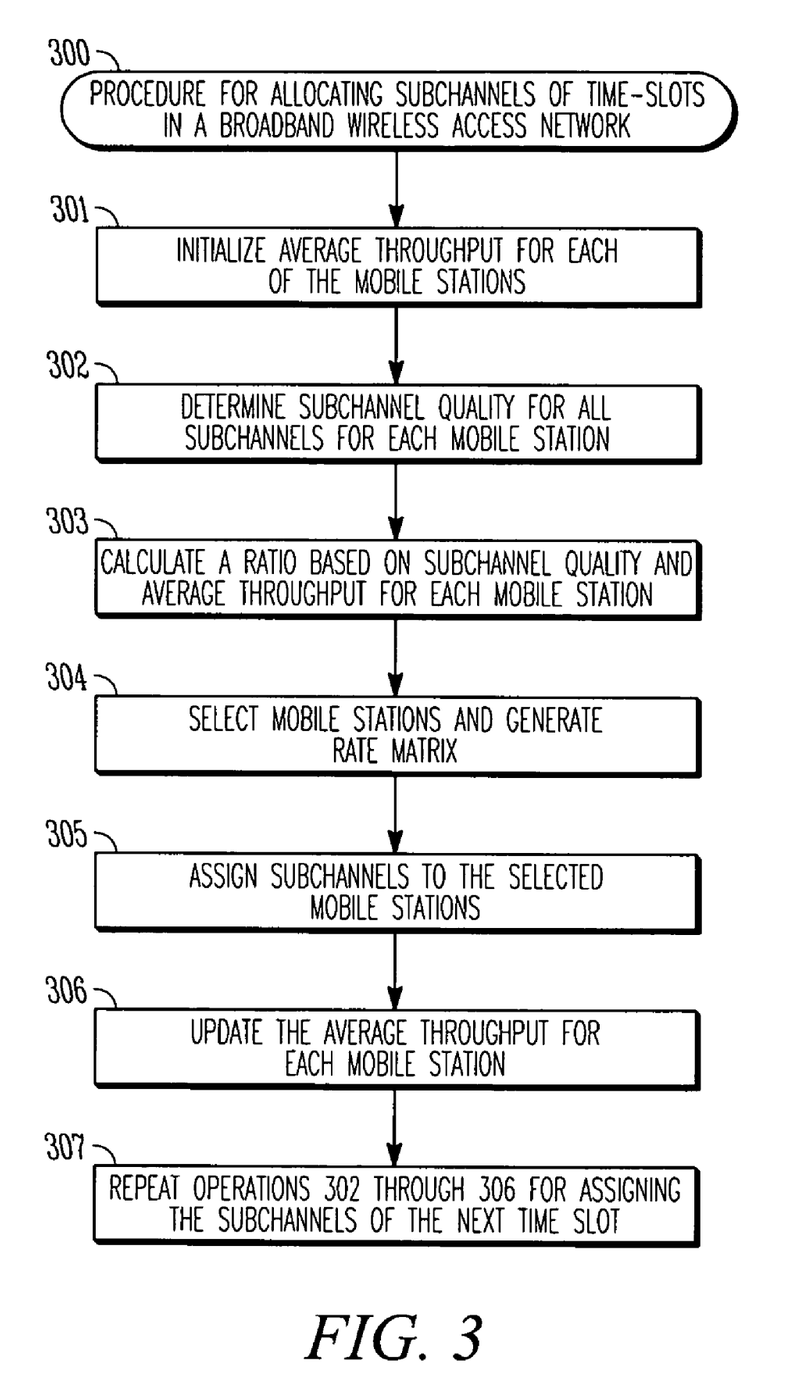
FIG. 3 is a flow chart of a procedure for allocating subchannels of time-slots in a broadband wireless access network in accordance with some embodiments of the present invention.

FIG. 3 is a flow chart of a procedure for allocating subchannels of time-slots in a broadband wireless access network in accordance with some embodiments of the present invention. Procedure 300 may be performed by a base station, such as base station 102 (FIG. 1), although other base-station configurations may also be used.

Operation 301 comprises initializing an average throughput of each of the mobile stations associated with the base station. In some embodiments, the average throughput may be initialized to a small positive value as discussed above. In some embodiments, operation 302 may be performed by metric-computation unit 135 (FIG. 1), although the scope of the invention is not limited in this respect.

Operation 302 comprises determining subchannel quality for all subchannels for each mobile station. In some embodiments, the subchannel quality may be determined by channel-quality processor 132 (FIG. 1) from CQIs 106 (FIG. 1) provided by one or more of mobile stations 105 (FIG. 1).

Operation 303 comprises calculating a ratio based on the subchannel quality and an average throughput for each mobile station. In some embodiments, operation 303 may comprise generating modified PF metric 131 (FIG. 1) based on the ratio as discussed above. In some embodiments, operation 303 may also comprise sorting the mobile stations based on their ratios. Operation 303 may be performed by metric-computation unit 135 (FIG. 1), although the scope of the invention is not limited in this respect.

Operation 304 comprises selecting mobile stations and generating a rate matrix. In some embodiments, operation 304 may comprise selecting mobile stations based on the ratio calculated in operation 303 and generating a rate matrix from rate vectors for each mobile station as discussed above. In some embodiments, operation 304 may be performed by scheduler 130 (FIG. 1), although the scope of the invention is not limited in this respect.

Operation 305 comprises assigning subchannels to the selected mobile stations. In some embodiments, operation 305 may assign subchannels based on the rate matrix generated in operation 304. In some embodiments, operation 305 may use an optimization algorithm as discussed above to assign subchannels. In some embodiments, operation 305 may be performed by scheduler 130 (FIG. 1).

Operation 306 comprises updating the average throughput for each mobile station. In some embodiments, the average throughput may be updated for both the selected mobile stations that were assigned subchannels in operation 305, as well as the non-selected mobile stations that were not assigned subchannels in operation 305. In some embodiments, the average throughput may be updated based on the throughput of prior time-slots and the instantaneous throughput of the current time-slot. In some embodiments, operation 306 may be performed by metric-computation unit 135 (FIG. 1), although the scope of the invention is not limited in this respect.

Operation 307 comprises repeating operations 302 through 306 for assigning the subchannels of the next time-slot. In some embodiments, operations 302 through 306 may be repeated for each time-slot 202 (FIG. 2) of downlink subframe 200 (FIG. 2).

Although the individual operations of procedure 300 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission, or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical, or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. A method for allocating subchannels and time-slots of an OFDMA resource block of a downlink frame among mobile stations in a wireless access network in which the mobile stations are configured to communicate using more than one subchannel, the method comprising:

calculating, for each mobile station of a plurality of mobile stations that have data to send, a ratio for each mobile station of a sum of instantaneous throughputs in all subchannels for said each mobile station to a time-averaged throughput for said each mobile station;

selecting a group of the mobile stations from the plurality having the greatest ratios;

generating a rate matrix comprising rate vectors of achievable throughputs of the selected group of mobile stations for the current time-slot;

assigning available subchannels of a current time-slot of a current downlink frame to the selected mobile stations; and repeating the calculating and selecting to assign available subchannels of a next time-slot of the current downlink frame to at least some of the remaining mobile stations that have not been assigned a subchannel in a prior time-slot, wherein assigning comprises applying an optimization algorithm to the rate matrix to maximize time-slot throughput of the current time slot.

2. The method of claim 1
wherein the time-averaged throughput of unselected mobile stations decreases when the calculating is repeated thereby increasing a probability that an unselected mobile station is selected for the next time-slot of the current frame, and wherein when the calculating is repeated, mobile stations that have been assigned a subchannel in the prior time-slot are excluded from the time-averaged throughput.

3. The method of claim 2 further comprising refraining from assigning subchannels of the time-slot to non-selected mobile stations, wherein the selecting comprises determining a number of mobile stations for assigning subchannels, the number being less than a total number of available subchannels, the number being determined to increase overall system throughput.

4. The method of claim 3 wherein determining the number of mobile stations to select is based on one or more of bandwidth requirements and service-level requirements for the mobile stations, wherein the number of mobile stations determined is not greater than a number of subchannels in the time-slot.

5. The method of claim 3 wherein the wireless access network implements a multicarrier access technique for transmitting multicarrier communication signals, wherein the subchannels comprise groups of subcarriers of the multicarrier communication signals, and wherein a measure of the subchannel quality is calculated from a channel quality indicator (CQI) provided by the mobile stations for each of the subchannels.

6. The method of claim 5 wherein the measure of the subchannel quality for each mobile station is further based on an instantaneous sum rate over all the subchannels that is calculated from either a signal-to-noise ratio or a signal to interference and noise ratio indicated by the CQI.

7. The method of claim 2 further comprising:

updating the time-averaged throughput for the selected mobile stations based on an actual throughput of prior assigned time-slots; and repeating the calculating, the selecting, and the assigning for a next time-slot by considering each mobile station of the plurality for selection based on the updated time-averaged throughput.

8. The method of claim 7 wherein the time-averaged throughput for a mobile station is updated by weighting an actual throughput of prior time-slot allocations and a current time-slot allocation.

9. The method of claim 7 further comprising transmitting a downlink frame comprising two or more time-slots having the subchannels of each of the time-slots assigned based on the calculating, selecting, assigning, updating, and repeating.

10. The method of claim 1 wherein the optimization algorithm comprises a binary assignment algorithm.

11. The method of claim 1 wherein assigning comprises:
assigning subchannels that comprise groups of adjacent subcarriers to lower-mobility mobile stations, and
assigning subchannels that comprise groups of non-adjacent subcarriers to higher-mobility mobile stations.

12. A wireless access network base station comprising:
a scheduler to allocate subchannels and time-slots of an OFDMA resource block of a downlink frame among mobile stations by calculating, for each mobile station of a plurality of mobile stations that have data to send, a ratio for each mobile station of a sum of instantaneous throughputs in all subchannels for said each mobile station to a time-averaged throughput for said each mobile station, selecting a group of the mobile stations from the plurality having the greatest ratios, generating a rate matrix comprising rate vectors of achievable throughputs of the selected group of mobile stations for the current time-slot, assigning available subchannels of a current time-slot of a current downlink frame to the selected mobile stations, and repeating the calculating and selecting to assign available subchannels of a next time-slot of the current downlink frame to at least some of the remaining mobile stations that have not been assigned a subchannel in a prior time-slot; and
a channel-quality processor to calculate the sum of instantaneous throughputs and an average throughput for each of the mobile stations,
wherein the scheduler applies an optimization algorithm to the rate matrix to maximize time-slot throughput of the current time slot when assigning the available subchannels, and
wherein the mobile stations are configured to communicate using more than one subchannel.

13. The base station of claim 12 wherein the time-averaged throughput of unselected mobile stations decreases when the calculating is repeated thereby increasing a probability that an unselected mobile station is selected for the next time-slot of the current frame, and
wherein when the scheduler repeats the calculating, mobile stations that have been assigned a subchannel in the prior time-slot are excluded from the time-averaged throughput.

14. The base station of claim 13 wherein the scheduler refrains from assigning subchannels of the time-slot to non-selected mobile stations, and
wherein the scheduler determines a number of mobile stations to select for assigning subchannels, the number being less than a total number of available subchannels and being determined to increase overall system throughput.

15. The base station of claim 14 wherein the number of mobile stations to select is determined based on one or more of bandwidth requirements and service-level requirements for the mobile stations, and
wherein the number of mobile stations to select is further determined by the scheduler to be not greater than a number of subchannels in the time-slot.

16. The base station of claim 14 wherein the base station implements a multicarrier access technique for transmitting multicarrier communication signals,
wherein the subchannels comprise groups of subcarriers of the multicarrier communication signals, and
wherein a measure of the subchannel quality is calculated from a channel quality indicator (CQI) provided by the mobile stations for each of the subchannels.

17. The base station of claim 13 wherein the metric-computation unit updates the time-averaged throughput for the selected mobile stations based on an actual throughput of prior assigned time-slots and calculates the ratio based on the updated time-averaged throughput, and
wherein the scheduler selects and assigns for a next time-slot by considering each mobile station of the plurality for selection based on the updated time-averaged throughput.

18. The base station of claim 17 wherein the time-averaged throughput for a mobile station is updated by the metric-computation unit by weighting an actual throughput of prior time-slot allocations and a current time-slot allocation.

19. The base station of claim 17 further comprising physical-layer circuitry to transmit a downlink frame comprising two or more time-slots having the subchannels of each of the time-slots assigned based on the updated average throughput.

20. The base station of claim 12 wherein the optimization algorithm comprises a binary assignment algorithm.

21. The base station of claim 12 wherein the scheduler assigns subchannels that comprise groups of adjacent subcarriers to lower-mobility mobile stations, and assigns subchannels that comprise groups of non-adjacent subcarriers to higher-mobility mobile stations.

* * * * *